(12) United States Patent
Sun et al.

(10) Patent No.: US 12,126,369 B2
(45) Date of Patent: Oct. 22, 2024

(54) HANDOVER METHOD, DEVICE, AND APPARATUS FOR FEEDER LINK AND USER EQUIPMENT BELONGING TO SATELLITE

(71) Applicant: DATANG MOBILE COMMUNICATIONS EQUIPMENT CO., LTD., Beijing (CN)

(72) Inventors: Jiancheng Sun, Beijing (CN); Shaohui Sun, Beijing (CN); Ye Zhou, Beijing (CN); Jiangsheng Fan, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 422 days.

(21) Appl. No.: 17/626,947

(22) PCT Filed: Jul. 16, 2020

(86) PCT No.: PCT/CN2020/102328
§ 371 (c)(1),
(2) Date: Jan. 13, 2022

(87) PCT Pub. No.: WO2021/008578
PCT Pub. Date: Jan. 21, 2021

(65) Prior Publication Data
US 2022/0264406 A1    Aug. 18, 2022

(30) Foreign Application Priority Data
Jul. 16, 2019 (CN) .................. 201910640965.X
Aug. 23, 2019 (CN) .................. 201910782564.8

(51) Int. Cl.
*H04B 7/185* (2006.01)
*H04W 36/00* (2009.01)
*H04W 36/08* (2009.01)

(52) U.S. Cl.
CPC .... *H04B 7/18513* (2013.01); *H04W 36/0016* (2013.01); *H04W 36/00837* (2018.08); *H04W 36/083* (2023.05)

(58) Field of Classification Search
CPC .......... H04B 7/18541; H04B 7/18513; H04W 56/001; H04W 36/0016; H04W 36/00837;
(Continued)

(56) References Cited

U.S. PATENT DOCUMENTS

| 6,522,635 | B1 | 2/2003 | Bedwell |
| 2016/0323800 | A1* | 11/2016 | Ulupinar ............... H04W 36/32 |
| 2017/0230104 | A1 | 8/2017 | Purkayastha et al. |

FOREIGN PATENT DOCUMENTS

| CN | 103428782 A | 12/2013 |
| CN | 108521662 A | 9/2018 |

(Continued)

OTHER PUBLICATIONS

CATT ("Discussion on SRI change", 3GPP TSG-RAN WG3 #103bis, R3-191235, Apr. 8-12, 2019) (Year: 2019).*

(Continued)

*Primary Examiner* — Ji-Hae Yea
(74) *Attorney, Agent, or Firm* — Harness, Dickey & Pierce, P.L.C.

(57) ABSTRACT

A feeder link handover method, device and apparatus, and a handover method, device and apparatus for user equipment belonging to a satellite are provided. The method includes: interacting with a target gateway by a source gateway and determining a handover time instant T and/or a target cell activation time instant T', wherein the handover time instant T is a time instant at which a previous feeder link is disconnected and establishment of a new feeder link is initiated, the target cell activation time instant T' is T+a time period Δ (delta) required for the establishment of the new (Continued)

A source gateway interacts with a target gateway and determines a handover time instant T and/or a target cell activation time instant T', wherein the handover time instant T is a time instant when a previous feeder link is disconnected and establishment of a new feeder link is initiated, the target cell activation time instant T' is T + a time period Δ required for the establishment of the feeder link — 701

The source gateway and the target gateway initiate the feeder-link handover at the handover time instant T, and instruct the UE to synchronize with the target cell at T' — 702 feeder link; initiating a feeder-link handover at the handover time instant T, and instructing a user equipment to synchronize with a target cell at the T'.

15 Claims, 5 Drawing Sheets

(58) Field of Classification Search
CPC ............ H04W 74/0833; H04W 36/08; H04W 36/008375; H04W 36/00838; H04W 36/083; H04W 36/085; H04W 36/087; H04W 36/13; H04W 74/0836; H04W 74/0838

See application file for complete search history.

(56) References Cited

FOREIGN PATENT DOCUMENTS

| | | | |
|---|---|---|---|
| CN | 109413662 | A | 3/2019 |
| CN | 109495160 | A | 3/2019 |
| EP | 0996242 | B1 | 1/2003 |

OTHER PUBLICATIONS

Extended European Search Report dated Jul. 1, 2022 for Application No. EP 20840451.7.

Ericsson, Interdigital, Thales, "Feeder link switch for transparent and regenerative LEO" Agenda Item 11.6.4.1.1, 3GPP TSG RAN WG2 #105bis, Tdoc R2-1905301, Apr. 8-12, 2019, Xian, China.

Chinese Office Action dated Jun. 2, 2021 for CN Application No. 201910782564.8.

Wang Hongu, Zhang Gengxin, Yu Jinpei, Analysis and Development Suggestion of Low-Earth Orbit Satellite Constellation Communication Statement, Jul. 2015.

Yan-Jing Liu, Ding-Yong Gou, Shi-Qi Wu, "Feeder Link Handover Schemes of Low Earth Orbit Satellite Mobile Systems", Journal of University of Electronic Science and Technology of China, vol. 36, No. 2, Apr. 2007.

Guo Song, Liu Wei, Guo Wei, "Control Technology and Simulation for Constellation Satellites Handoff", vol. 43, No. 08, 2010, No. 224 State Key Laboratory of Anti-interference Communications, Univ. of Electron Sci & Tech. of China, Chengu Sichuan, China, Aug. 2010.

* cited by examiner

HANDOVER METHOD, DEVICE, AND APPARATUS FOR FEEDER LINK AND USER EQUIPMENT BELONGING TO SATELLITE

CROSS-REFERENCE TO RELATED APPLICATION

This application is a U.S. national phase application of a PCT Application No. PCT/CN2020/102328 filed on Jul. 16, 2020, which claims priorities of the Chinese Patent Application No. 201910640965.X filed in China on Jul. 16, 2019 and the Chinese Patent Application No. 201910782564.8 filed in China on Aug. 23, 2019, the disclosures of which are incorporated herein by reference in their entireties.

TECHNICAL FIELD

The present disclosure relates to the field of radio communication technology, and more particularly, relates to a handover method for a feeder link, a handover method for a user equipment belonging to a satellite, a handover device and a handover apparatus for a feeder link, a handover device and a handover apparatus for a user equipment belonging to a satellite.

BACKGROUND

A current scenario is that a low-orbiting satellite can only be connected to one ground gateway at the same time. In this scenario, when a satellite is connected to only one ground gateway at any time, the satellite needs to cut off connection with the original ground gateway before connecting with a new gateway, if a feeder link is handed over. FIG. 1 shows a feeder-link handover scenario at time T1, and FIG. 2 shows a feeder-link handover scenario at time T2. As shown in FIG. 1 and FIG. 2, both before and after a certain handover threshold, the satellite is connected only to a gateway, the satellite is only connected with a gateway 1 at the time T1, and is connected only with a gateway 2 at time T2.

When this kind of handover process occurs, it will bring about significant business interruption. Since each satellite contains multiple beams (cells), each beam has hundreds to thousands of access users. In a feeder-link handover process, it is necessary to hand over groups of up to tens of thousands of users. This brings great challenges to such as random-access resource requirements, a handover delay, and a handover success rate.

Disadvantages in the related art are as follow. There is no clear method to support a feeder-link handover scenario, and it is also not known about how two gateways negotiate a feeder-link handover time; therefore, it is possible that a source side has been disconnected, but a target has not started to connect, causing additional service interruptions.

SUMMARY

Embodiments of the present disclosure provide a feeder-link handover method, device and apparatus, and a handover method, device and apparatus for user equipment belonging to a satellite, so as to solve the problem of service interruptions during a feeder-link handover between two gateways.

Some embodiments of the present disclosure provide a feeder-link handover method. The method includes following: interacting between a target gateway and a source gateway and determining a handover time instant T and/or a target cell activation time instant T', wherein the handover time instant T is a time instant at which a previous feeder link is disconnected and establishment of a new feeder link is initiated, the target cell activation time instant T' is T+a time period Δ (delta) required for the establishment of the new feeder link; initiating, by the source gateway, a feeder-link handover at the handover time instant T with the target gateway, and instructing UE to synchronize with a target cell at the T'.

In implementation, interacting between the target gateway and the source gateway and determining the handover time instant T includes one or a combination of the following: sending handover reference time to the target gateway by the source gateway, the handover reference time being used by the target gateway to select the handover time instant T according to the handover reference time, and receiving, by the source gateway, the handover time instant T selected by the target gateway; or, determining the handover time instant T by the source gateway and notifying the target gateway of the handover time instant T; or, receiving, by the source gateway, the handover time instant T determined by the target gateway.

In implementation, interacting between the target gateway and the source gateway and determining the handover time instant T includes one or a combination of the following: receiving, by the target gateway, handover reference time sent by the source gateway to the target gateway, the handover reference time being used by the target gateway to select the handover time instant T according to the handover reference time, and selecting, by the target gateway, the handover time instant T according to the handover reference time, and informing the handover time instant T to the source gateway; or, determining the handover time instant T by the target gateway and notifying the source gateway of the handover time instant T; or, receiving, by the target gateway, the handover time instant T determined by the source gateway.

In implementation, the handover reference time is: a latest time instant t1 at which the source gateway serves a feeder link, and a latest time instant t3 at which the source gateway completes handover preparation for all UEs, currently served by the satellite, to hand over to the target gateway.

In implementation, the handover time instant T selected by the target gateway according to the handover reference time is a time instant T' selected between max(t2, t3) and t1, t2 is an earliest time instant at which the target gateway establishes a feeder link with a satellite.

In implementation, the target cell activation time instant T' is determined by the target gateway and included in a handover message sent to all UEs currently served by a satellite.

In implementation, T and/or T' are GNSS time; and/or T and/or T' are SFNs of the source gateway.

Some embodiments of the present disclosure provide a handover method for a UE belonging to a satellite. The handover method includes: receiving, by the UE, a target cell activation time instant T' notified by a source gateway, wherein the target cell activation time instant T' is T+a time period Δ (delta) required for establishment of a feeder link, a handover time instant T is a time instant at which a previous feeder link is disconnected and establishment of a new feeder link is initiated, synchronizing with a target cell at T' by the UE.

In implementation, the target cell activation time instant T' is determined by a target gateway and is included in a handover message and sent to all UEs currently served by the satellite.

In implementation, the method further includes: performing random access channel (RACH) access through configuration in the handover message by the UE to complete a handover process.

In implementation, T and/or T' are GNSS time; and/or, T and/or T' are SFNs of the source gateway.

Some embodiments of the present disclosure provide a gateway. The gateway includes: a processor, configured to read a program in a storage and implements the following processes: interacting with a target gateway and determining a handover time instant T and/or a target cell activation time instant T', in a case that the gateway is used as a target gateway, or interacting with a source gateway and determining a handover time instant T and/or a target cell activation time instant T' in a case that the gateway is used as a target gateway, and wherein the handover time instant T is a time instant at which a previous feeder link is disconnected and establishment of a new feeder link is initiated, the target cell activation time instant T' is T+a time period Δ (delta) required for the establishment of the new feeder link; initiating a feeder-link handover at the handover time instant T, and instructing a user equipment UE to synchronize with a target cell at the T'; and a transceiver, configured to receive and send data under a control of the processor.

In implementation, in the case that the gateway is used as the source gateway, interacting with the target gateway and determining the handover time instant T includes one or a combination of the following: sending handover reference time to the target gateway by the source gateway, the handover reference time being used by the target gateway to select the handover time instant T according to the handover reference time, and receiving, by the source gateway, the handover time instant T selected by the target gateway; or, determining the handover time instant T by the source gateway and notifying the target gateway of the handover time instant T; or, receiving, by the source gateway, the handover time instant T determined by the target gateway.

In implementation, in a case that the gateway is used as the target gateway, interacting with the source gateway and determining the handover time instant T includes one or a combination of the following: receiving, by the target gateway, handover reference time sent by the source gateway to the target gateway, the handover reference time being used by the target gateway to select the handover time instant T according to the handover reference time, and selecting, by the target gateway, the handover time instant T according to the handover reference time, and informing the handover time instant T to the source gateway; or, determining the handover time instant T by the target gateway and notifying the source gateway of the handover time instant T; or, receiving, by the target gateway, the handover time instant T determined by the source gateway.

In implementation, the handover reference time is: a latest time instant t1 at which the source gateway serves a feeder link, and a latest time instant t3 at which the source gateway completes handover preparation for all UEs, currently served by the satellite, to hand over to the target gateway.

In implementation, the handover time instant T selected according to the handover reference time is a time instant T selected between max(t2, t3) and t1, t2 is an earliest time instant at which the target gateway establishes a feeder link with a satellite.

In implementation, the target cell activation time instant T' is determined by the target gateway and included in a handover message sent to all UEs currently served by a satellite.

In implementation, T and/or T' are GNSS time; and/or T and/or T' are SFNs of the source gateway.

Some embodiments of the present disclosure provide a UE. The UE includes: a processor configured to read a program in a storage and implement the following processes: receiving a target cell activation time instant T' notified by a source gateway, wherein the handover time instant T is a time instant at which a previous feeder link is disconnected and establishment of a new feeder link is initiated, the target cell activation time instant T' is T+a time period Δ (delta) required for establishment of a feeder link, and synchronizing with a target cell at T'; a transceiver configured to receive and send data under a control of the processor.

In implementation, the target cell activation time instant T' is determined by a target gateway and is included in a handover message and sent to all UEs currently served by the satellite.

In implementation, the UE performs random access channel RACH access through configuration in the handover message to complete a handover process.

In implementation, T and/or T' are GNSS time; and/or T and/or T' are SFNs of the source gateway.

Some embodiments of the present disclosure provide a feeder-link handover device at a gateway. The device includes: an interaction module, configured to interact with a target gateway and determine a handover time instant T and/or a target cell activation time instant T' in a case that the gateway is used as a source gateway, or interact with a source gateway and determine a handover time instant T and/or a target cell activation time instant T' in a case that the gateway is used as a target gateway, wherein the handover time instant T is a time instant at which a previous feeder link is disconnected and establishment of a new feeder link is initiated, the target cell activation time instant T' is T+a time period Δ (delta) required for the establishment of the new feeder link; a handover module, configured to initiate a feeder-link handover at the handover time instant T, and instruct a UE to synchronize with a target cell at the T'.

Some embodiments of the present disclosure provide a handover device for UE belonging to a satellite. The handover device includes: a reception module, configured to receive a target cell activation time instant T' notified by a source gateway, wherein the handover time instant T is a time instant at which a previous feeder link is disconnected and establishment of a new feeder link is initiated, the target cell activation time instant T' is T+a time period Δ (delta) required for establishment of a feeder link; a synchronization module, configured to synchronize with a target cell at T'.

Some embodiments of the present disclosure provide a readable storage medium, wherein the readable storage medium stores a program for implementing the above methods.

The beneficial effects of the present disclosure are as follows: by adopting the solutions provided in some embodiments of the present disclosure, since it can provide an accurate handover time instant, so that if the source gateway disconnects a feeder link, the target gateway can initiate an establishment process of feeder links to the same satellite, and the service interruption caused by feeder-link handover is reduced to the minimum extent. Further, in order to enable the UE to access the target cell in time, activation time is also added to the handover command, which reduces a handover time delay and better guarantees the service continuity of the UE before and after the handover.

BRIEF DESCRIPTION OF THE DRAWINGS

Accompanying drawings described herein are used to provide further understanding of the present disclosure and constitute a part of the present disclosure. Illustrative embodiments of the present disclosure and descriptions thereof are used to explain the present disclosure, and do not constitute any improper limitation on the present disclosure.

DETAILED DESCRIPTION

A satellite internet has advantages of wide coverage, less impact from natural disasters and physical attacks. The satellite internet can be deeply integrated with a terrestrial mobile communication network (such as a 5G network) to make up for an insufficient coverage of a terrestrial mobile network, and form, with the terrestrial network, a converged network system with complementary advantages, close integration, and three-dimensional layering, thereby realizing global transmission and interaction of information.

The satellite internet is classified as synchronous satellites, medium-orbit satellites and low-orbit satellites; a distance of low-orbit satellites is characterized by being close to the ground, and a communication delay between terminals on the ground is moderate, and the low-orbit satellite also has characteristics such as a fast moving speed, a large path loss, a limited satellite power, and other characteristics.

A basic assumption of a traditional mobile communication access network is that a Radio Access Network (RAN) is fixed and a User Equipment (UE) is mobile. All network designs including physical layer parameters and a network identification design are based on the above assumption.

A very important difference between an access network of the satellite internet and an access network of traditional mobile communication is that RAN is not necessarily immobile. For example, the RAN for low-orbit satellites may move at a high speed. In addition to considering mobility of a UE itself, with a rapid movement of the low-orbit satellites, coverage of the RAN also changes rapidly, which poses new challenges for mobility management.

Figure 1:
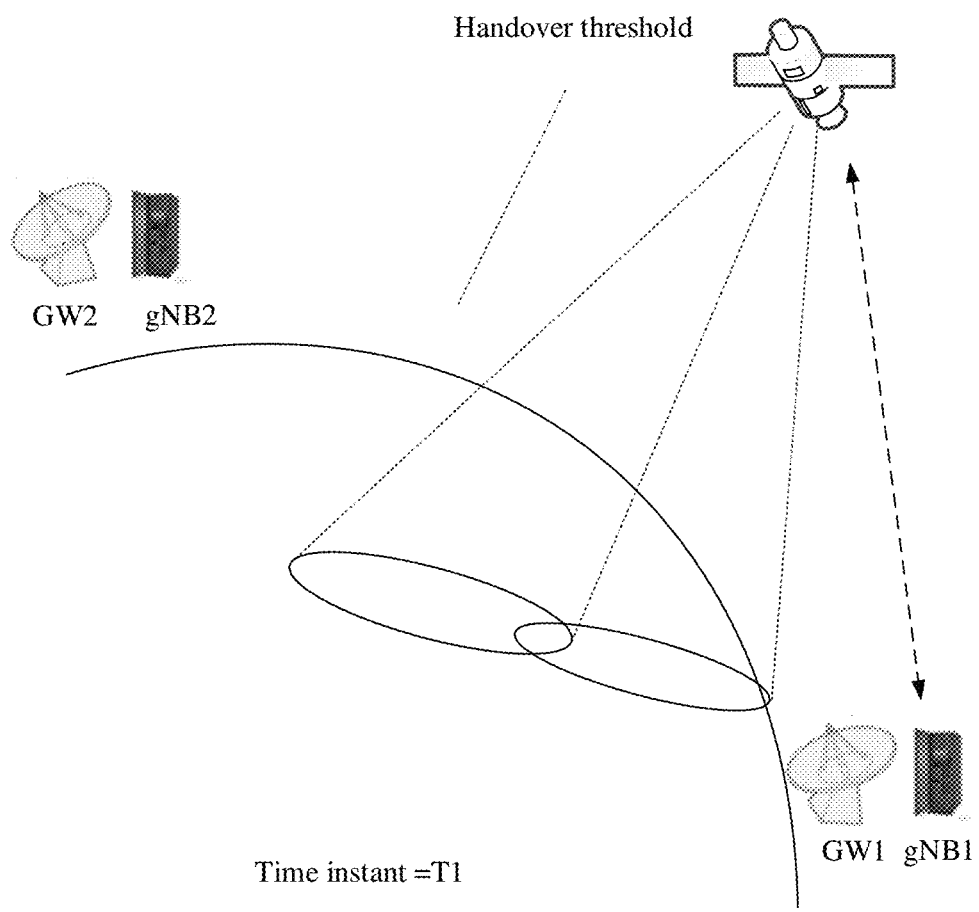
FIG. 1 is a schematic diagram of a feeder-link handover scenario at time T1 in a background technology.
Figure 2:
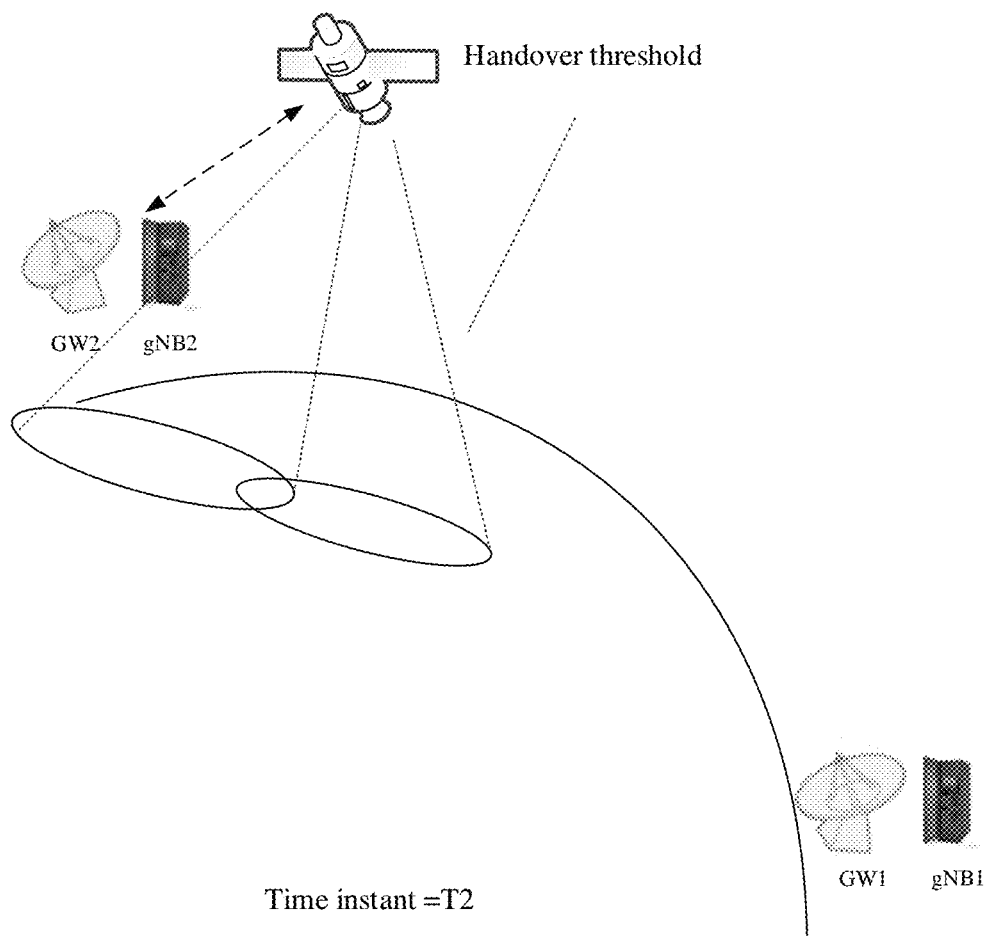
FIG. 2 is a schematic diagram of a feeder-link handover scenario at time T2 in a background technology.
Figure 3:
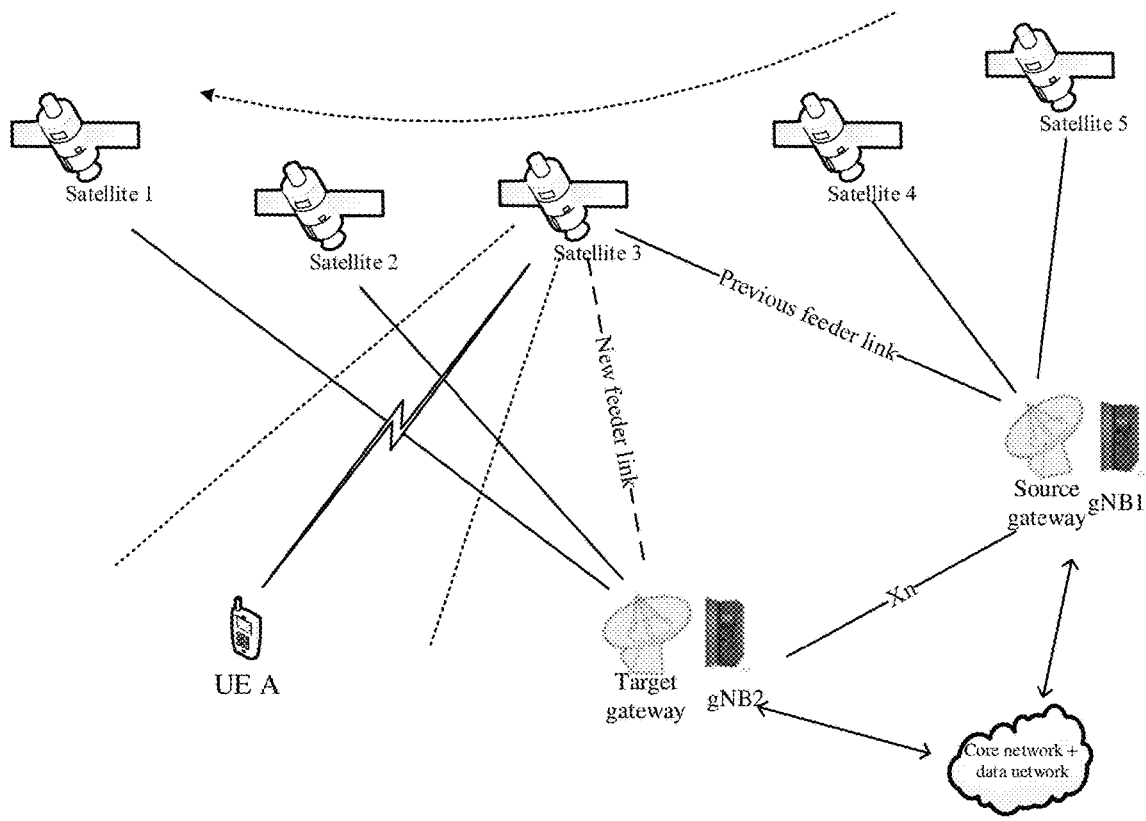
FIG. 3 is a schematic diagram of a feeder-link handover scenario in some embodiments of the present disclosure.

As a satellite moves, a ground gateway connected to the satellite may not be able to continue to serve the satellite. As a substitution, another gateway on the ground will continue to serve the satellite. FIG. 3 is a schematic diagram of a feeder-link handover scenario. As shown in FIG. 3, a feeder link of a satellite 3 will hand over from a source gateway to a target gateway at a certain time instant (T). During the handover, all terminals working with the satellite need to hand over to the target gateway.

Disadvantage in the related art is that there is no clear method to support the scenario of feeder-link handover, and it is impossible to know how two gateways negotiate the feeder-link handover time. Therefore, a case that a source side may be disconnected, but a target has not yet started to connect may happen, which will cause additional service interruption.

Further, during a feeder-link handover process, all UEs served by the satellite must hand over from the source gateway to the target gateway. A handover preparation process must be carried out in advance (when a target feeder link has not been established and a target cell has not yet appeared). In this case, when the UE initiates access to the target cell according to a handover command is also a problem.

That is, based on the above introduction for scenarios, it is necessary to provide a technical solution to realize a "relay" between new and previous feeder links in the process of feeder-link handover, and to hand, from the source gateway to the target gateway, over all connected UEs served by satellites, and to guarantee business continuity to the maximum extent and reduce data interruption caused by the handover. Based on this, some embodiments of the present disclosure provide a feeder-link handover solution, so that the source gateway and the target gateway can negotiate a handover time point T for feeder links, so that the source and target cells can provide relay services as much as possible.

The specific embodiments of the present disclosure will be described below with reference to the accompanying drawings.

Description of implementations at the source gateway side, the target gateway side, and a UE side will be explained respectively, and then an example for cooperation of the source gateway, the target gateway, and the UE will be given to better understand the implementations given in some embodiments of the present disclosure. This way of explanation does not mean that implementations of the source gateway, the target gateway, and the UE must be executed in cooperation or separately. In fact, when implementations of the source gateway, the target gateway and the UE side are separately, problems related to the source gateway, the target gateways and the UE side are addressed individually, and if the implementations of the source gateway, the target gateway and the UE side are used in cooperation, better technical effects will be obtained.

After determining the feeder-link handover time instant T, the source gateway will disconnect a feeder link with the satellite at time T, and the target gateway initiates establishment of the feeder link with the satellite. Therefore, a principle of determining the handover time instant T will be described below first.

Figure 4:
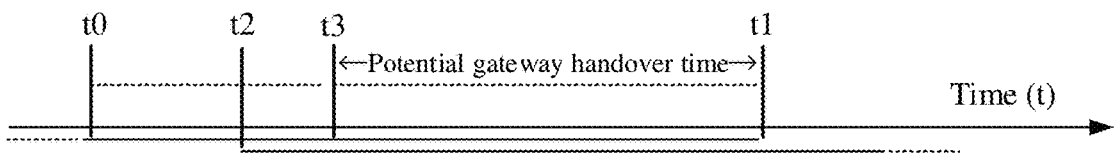
FIG. 4 is a schematic diagram of feeder-link handover time selection 1 in some embodiments of the present disclosure.
Figure 5:
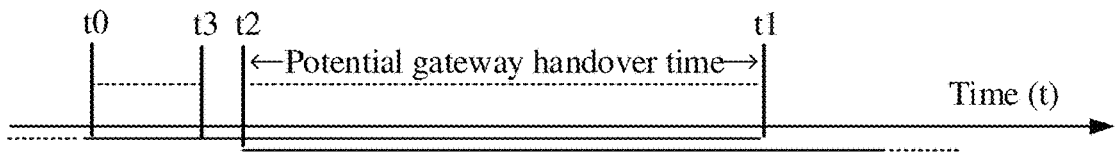
FIG. 5 is a schematic diagram of feeder-link handover time selection 2 in some embodiments of the present disclosure.

FIG. 4 is a schematic diagram of feeder-link handover time selection 1, and FIG. 5 is a schematic diagram of feeder-link handover time selection 2, in the figures:

t0: handshake time between the source gateway and the target gateway (a current time instant);

t1: latest possible time for the source gateway to serve a feeder link;

t2: earliest possible time for the target gateway to establish a feeder link with a satellite;

t3: completion time of handover preparation of all UEs.

As shown in FIG. 4 and FIG. 5, a handover time instant (T) of the feeder link needs to be selected to be within a period in which both the source gateway and the target gateway can be connected to the satellite (an overlapped area of lines for t0 and t2). At the same time, the handover time instant T also needs to be selected to be after handover preparation of all UEs is completed, that is, after t3. According to FIG. 4 and FIG. 5, a possible gateway handover time instant is in an interval (max(t2, t3)~t1). In this case, a determination scheme of the feeder-link handover time instant (T) can be as follows:

the time instant T is determined by the target gateway, the source gateway informs the target gateway of a possible gateway handover time instant interval (t3~t1), and then the target gateway determines a time instant T and returns the same to the source gateway.

The following describes how to determine an activation time instant T' of a target feeder link.

Figure 6:
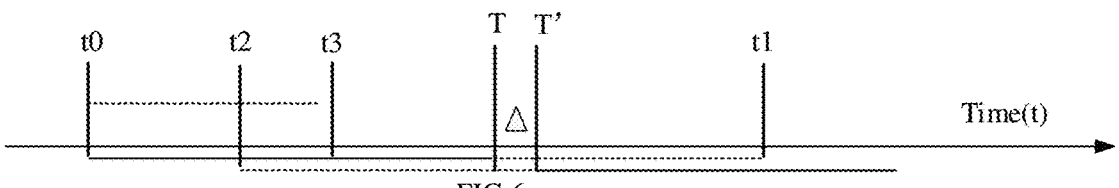
FIG. 6 is a schematic diagram of feeder-link handover and configuration activation time in some embodiments of the present disclosure.

FIG. 6 is a schematic diagram of feeder-link handover and configuration activation time. In the figure:

t0: handshake time between the source gateway and the target gateway (a current time instant);

t1: latest possible time for the source gateway to serve a feeder link;

t2: earliest possible time for the target gateway to establish a feeder link with a satellite;

t3: completion time of handover preparation of all UEs;

T: a time instant of feeder-link handover when the source gateway disconnects the feeder link, and the target gateway initiates the feeder-link handover;

Δ (delta): a time period from establishment of the feeder link to activation of the feeder link, including time periods of antenna switching, handshaking between gateways and a satellite, and signal forwarding;

T': feeder link activation time of the target gateway, T'=T+Δ.

As shown in the figure, when confirming the activation time T' of the target feeder link, the activation time of target cell configuration in a handover message depends on the activation time of the target feeder link. According to FIG. 6, the activation time of the target feeder link is T'. Since the target gateway can clearly know the feeder-link handover time instant T and the time period delta required to establish and activate the feeder link, the target gateway can infer the activation time T' of the target feeder link.

The activation time T' of the target feeder link can be configured to the UE in a handover command. When the UE is at T', the UE first needs to perform downlink synchronization with the target cell, that is, search for a Primary Synchronization Signal/Secondary Synchronization Signal (PSS/SSS). After downlink synchronization is successful, Random Access Channel (RACH) access is initiated to the target cell according to a RACH resource configured in a handover message previously received.

In the embodiment of this application, T and/or T' may be GNSS (Global Navigation Satellite System) time; and/or, T and/or T' may be a System Frame Number (SFN) of the source gateway.

The implementations of the source gateway, the target gateway, and the UE are described separately below.

Figure 7:
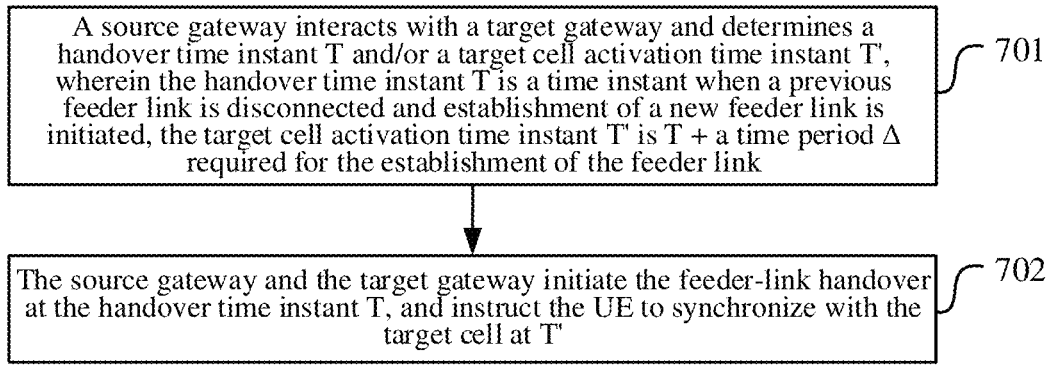
FIG. 7 is a schematic diagram of an implementation process of a feeder-link handover method in some embodiments of the present disclosure.

FIG. 7 is a schematic diagram of an implementation process of a feeder-link handover method. As shown in the figure, the method may include:

Step 701: the source gateway interacts with the target gateway and determines a handover time instant T and/or a target cell activation time instant T', wherein the handover time instant T is a time instant when the previous feeder link is disconnected and establishment of a new feeder link is initiated, the target cell activation time instant T' is T+the time period required for the establishment of the feeder link (delta);

Step 702: the source gateway and the target gateway initiate the feeder-link handover at the handover time instant T, and instruct the UE to synchronize with the target cell at T'.

In some implementations, the activation time instant T' of the target cell is determined by the target gateway and is included in the handover message and sent to all UEs currently served by the satellite.

In some implementations, the source gateway interacts with the target gateway and determines the handover time instant T. This step includes one or a combination of the following methods:

the source gateway sends handover reference time to the target gateway for the target gateway to select a handover time instant T according to the handover reference time, and the source gateway receives the handover time instant T selected by the target gateway; or, the source gateway determines the handover time instant T and informs the same to the target gateway; or, the source gateway receives the handover time instant T determined by the target gateway.

In some implementations, a case can also be as follow: the source gateway interacts with the target gateway and determines the handover time instant T, this includes one or a combination of following methods:

the target gateway receives the handover reference time sent by the source gateway to the target gateway, the handover reference time is used for the target gateway to select the handover time instant T according to the handover reference time. The target gateway selects the handover time instant T, and the source gateway is notified of the handover time instant T by the target gateway; or, the target gateway determines the handover time instant T and informs the same to the source gateway; or, the target gateway receives the handover time instant T determined by the source gateway.

In a specific implementation, the handover time instant T can be determined by the source gateway or the target gateway, and then the source gateway or the target gateway informs the handover time instant T to the target gateway or the source gateway after information interaction; or the source gateway sends the handover reference time to the target gateway, the target gateway selects the handover time instant T according to the handover reference time. The following implementation will mainly be described by taking, as an example, a case in which the source gateway provides the handover reference time and the target gateway selecting the handover time instant T.

Figure 8:
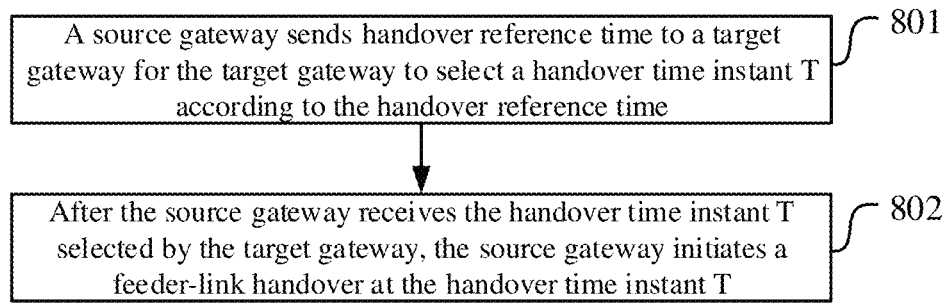
FIG. 8 is a schematic diagram of an implementation process of a method for ae gateway to determine a time instant of feeder-link handover in some embodiments of the present disclosure.

FIG. 8 is a schematic diagram of an implementation process of a method of determining a feeder-link handover time instant by a gateway, as shown in the figure. This method includes following:

Step 801: the source gateway sends the handover reference time to the target gateway for the target gateway to select the handover time instant T according to the handover reference time;

Step 802: after the source gateway receives the handover time instant T selected by the target gateway, the source gateway initiates a feeder-link handover at the handover time instant T.

In some implementations, the handover reference time is as follow: the latest possible time t1 for the source gateway to serve the feeder link, and the latest possible time t3 for the source gateway to complete all UEs currently served by the satellite and prepare for handover to the target gateway.

Figure 9:
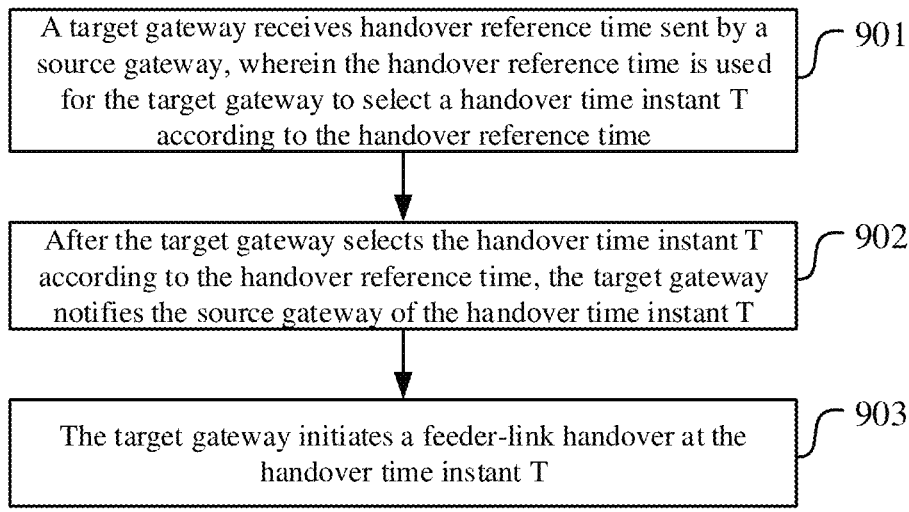
FIG. 9 is a schematic diagram of an implementation process of a method for a target gateway to determine a time instant of the feeder-link handover in some embodiments of the present disclosure.

FIG. 9 is a schematic diagram of an implementation process of a method for the target gateway to determine the feeder-link handover time instant, as shown in the figure, the implementation processes includes:

Step 901: the target gateway receives the handover reference time sent by the source gateway to the target gateway, wherein the handover reference time is used for the target gateway to select the handover time instant T according to the handover reference time;

Step 902: after the target gateway selects the handover time instant T according to the handover reference time, the target gateway notifies the source gateway of the handover time instant T;

Step 903: the target gateway initiates a feeder-link handover at the handover time instant T.

In some implementations, the handover reference time is: the latest possible time t1 for the source gateway to serve the feeder link, and the latest possible time t3 for the source gateway to complete preparation of all UEs currently served by the satellite to hand over to the target gateway.

In some implementations, the handover time instant T selected by the target gateway according to the handover reference time is a selected handover time instant T between max(t2, t3) and t1, and t2 is the earliest possible time instant at which the target gateway establishes a feeder link with the satellite.

In some implementations, a case may further include: the target gateway notifies a target cell activation time instant to all UEs currently served by the satellite, wherein the target cell activation time instant T' is T+a time period (delta) required by a feeder-link establishment process. The target cell activation time instant T' is determined by the target gateway and included in the handover message sent to all UEs currently served by the satellite.

Figure 10:
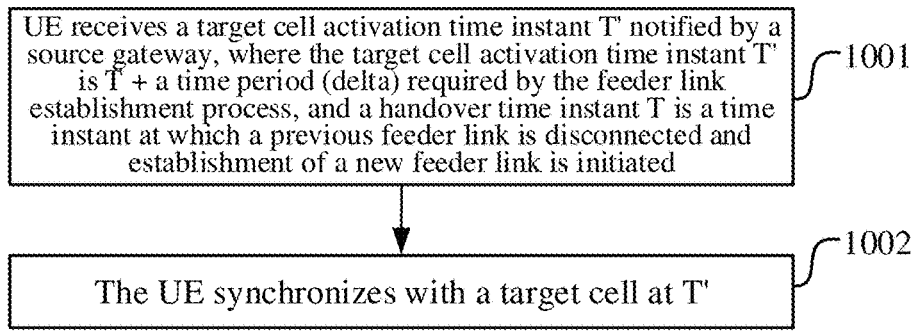
FIG. 10 is a schematic diagram of an implementation process of a UE-side handover method for a UE belonging to a satellite in some embodiments of the present disclosure.

FIG. 10 is a schematic diagram of the implementation process of a UE-side handover method of a UE belonging to a satellite, as shown in the figure, the method includes following steps.

Step 1001: the UE receives a target cell activation time instant T' notified by the source gateway, where the target cell activation time instant T' is T+a time period (delta) required by the feeder link establishment process, and the handover time instant T is the time instant when a previous feeder link is disconnected and establishment of a new feeder link is initiated;

Step 1002: the UE synchronizes with the target cell at T'.

In some implementations, the target cell activation time instant T' is determined by the target gateway and included in the handover message and sent to all UEs currently served by the satellite.

In some implementations, the method can further include that the UE uses configuration in the handover message to perform RACH access and complete the handover process.

The following is an explanation from the perspective of the combination of the three sides.

1. The source gateway and the target gateway negotiate to determine an accurate feeder-link handover time instant T. At this moment, the source gateway disconnects the feeder link with the satellite, and the target gateway starts to initiate the establishment of a new feeder link.

2. According to the ephemeris, the source gateway judges that a certain satellite will move out of a service range of the source gateway at time t1. The source gateway sends a feeder-link handover request message to the target gateway. The message can include a satellite identification, a longest possible service time t1 of the current feeder link and the latest time t3 at which the handover preparation for handing over to the target gateway by all UEs currently served by the satellite is completed.

3. After receiving the feeder-link handover request, the target gateway judges, based on the satellite identification indicated by the message and based on ephemeris and other information, whether the satellite has entered a service range of the target gateway or when (i.e.: t2) the target gateway can connect to the satellite and enable the satellite to serve the target gateway. Combining t1 and t3 in the message, the target gateway can determine an appropriate feeder-link handover time instant T in the time interval (max(t2,t3)~t1). The target gateway returns a feeder-link handover response to the source gateway, and the response contains the satellite identification and the above-mentioned handover time instant T.

4. The source gateway initiates a handover preparation process for each UE under the satellite, the target gateway determines the target cell activation time instant T'=T+delta according to the above mentioned T and the time period delta for the feeder link establishment process, and inform the UE of the activation time instant in the handover message.

5. The UE synchronizes with the target cell at the time instant T', and then uses the configuration in the handover command to perform the RACH access and complete the handover process.

All of concepts of the handover message and the handover signaling involved in the implementation have one meaning for the Uu interface, i.e., they all refer to the handover message sent to the UE.

The handover message carries the activation time T'. In a traditional handover, the UE immediately performs the handover after receiving the handover message. The difference from the traditional handover is that in this example, the handover cannot be performed immediately, but the handover is performed at the time T', and T' is issued in advance through the handover message.

The following is an example for description.

In this example, the target gateway determines the feeder-link handover time instant T and informs the same the source gateway. In the example, the source gateway A, the target gateway B, and the satellite X is currently connected to the gateway A and will be connected to the target gateway B.

1) The gateway A informs the gateway B of t1 and t3 in the feeder-link handover request message, and the target gateway B determines the time instant T based on this information and the starting time t2 at which the gateway B can connect to the satellite X.

2) The target gateway replies to the source gateway with the feeder-link handover response message. The message contains the time T. Both gateways use this time to complete the processes of disconnecting a feeder link and establishing a feeder link.

3) After receiving the feeder-link handover response, the source gateway initiates a handover preparation process for all UEs served by the satellite X.

4) The target gateway B determines the activation time T' of handover configuration according to T and the time period Delta required by establishment of a feeder link and fills the same in the handover message of each UE.

The source gateway initiates handover preparation, and the target gateway allocates resources for the UEs, prepares handover messages, and returns the messages to the source gateway. Then the source gateway sends the handover messages to the UEs. That is, the target cell activation time instant T' is determined by the target gateway and is included in the handover message and sent to all UEs currently served by the satellite.

Based on the same invention concept, some embodiments of the present disclosure also provide a gateway, a user equipment, a feeder-link handover device, a handover device for a UE belonging to a satellite, and a readable storage medium. since the principle of solving the problems by these devices or apparatus is similar to the feeder-link handover method and the handover method of a UE belonging to a satellite, therefore, the implementation of these devices can refer to the implementation of the methods, and the repetition will not be provided.

When implementing the technical solutions provided by some embodiments of the present disclosure, they can be implemented as follows.

Figure 11:
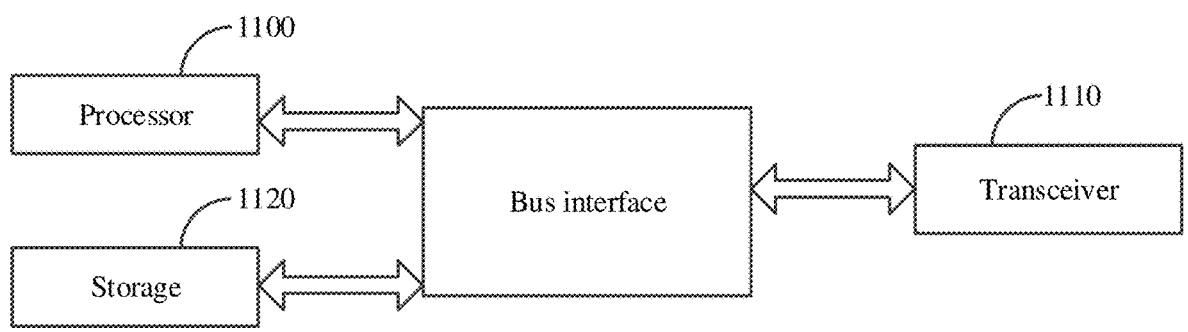
FIG. 11 is a schematic diagram of a structure of a source gateway in some embodiments of the present disclosure.

FIG. 11 is a schematic diagram of the structure of a source gateway. As shown in the figure, a base station includes: a processor 1100 configured to read a program in a storage 1120, and implements the following processes:

interacting with a target gateway when the gateway is used as a source gateway or interacting with a source gateway when the gateway is used as a target gateway, and determining a handover time instant T and/or a target cell activation time instant T', wherein the handover time instant T is a time instant when a previous feeder link is disconnected and establishment of a new feeder link is initiated, and the target cell activation time instant T' is T+ the time period (delta) required for the establishment of the feeder link;

initiating a feeder-link handover at this handover time instant T, instructing the UE to synchronize with the target cell at T';

wherein a transceiver 1110 is configured to receive and send data under the control of the processor 1100.

In some implementations, when the gateway serves as the source gateway, the source gateway interacts with the target gateway to determine the handover time instant T. This step includes one or a combination of the following steps:

the source gateway sends the handover reference time to the target gateway for the target gateway to select the handover time instant T according to the handover reference time, and the source gateway receives the handover time instant T selected by the target gateway; or, the source gateway determines the handover time instant T and informs the handover time instant T to the target gateway; or, the source gateway receives the handover time instant T determined by the target gateway.

In some implementations, when the gateway is used as the target gateway, the source gateway and the target gateway determine the handover time instant T after interacting. This step includes one or a combination of the following steps:

the target gateway receives the handover reference time sent by the source gateway to the target gateway, the handover reference time is used for the target gateway to select the handover time instant T according to the handover reference time, the target gateway selects the handover time instant T according to the handover reference time, and the source gateway is notified of the handover time instant T by the target gateway; or, the target gateway determines the handover time instant T and informs the handover time instant T to the source gateway; or, the target gateway receives the handover time instant T determined by the source gateway.

In some implementations, the handover reference time is: the latest possible time t1 for the source gateway to serve the feeder link, and the latest possible time t3 for the source gateway to complete preparation for all UEs, currently served by the satellite, to hand over to the target gateway.

In some implementations, the handover time instant T selected according to the handover reference time is a handover time instant T selected between max(t2, t3) and t1, t2 is the earliest possible time instant at which the target gateway can establish a feeder link with the satellite.

In some implementations, the target cell activation time instant T' is determined by the target gateway and is included in the handover message and sent to all UEs currently served by the satellite.

In some implementations, T and/or T' are GNSS time; and/or, T and/or T' are the SFN of the source gateway.

In FIG. 11, a bus architecture may include any number of interconnected buses and bridges. Specifically, various circuits such as one or more processors represented by the processor 1100 and a memory represented by the storage 1120 are linked together. The bus architecture can also link various other circuits such as peripherals, voltage regulators, power management circuits, etc., which are all known in the art, and therefore, will not be further described herein. The bus interface provides the interface. The transceiver 1110 may be a plurality of elements, including a transmitter and a transceiver, and provide a unit for communicating with various other devices on a transmission medium. The processor 1100 is responsible for managing the bus architecture and general processing, and the storage 1120 may store data used by the processor 1100 when performing operations.

Figure 12:
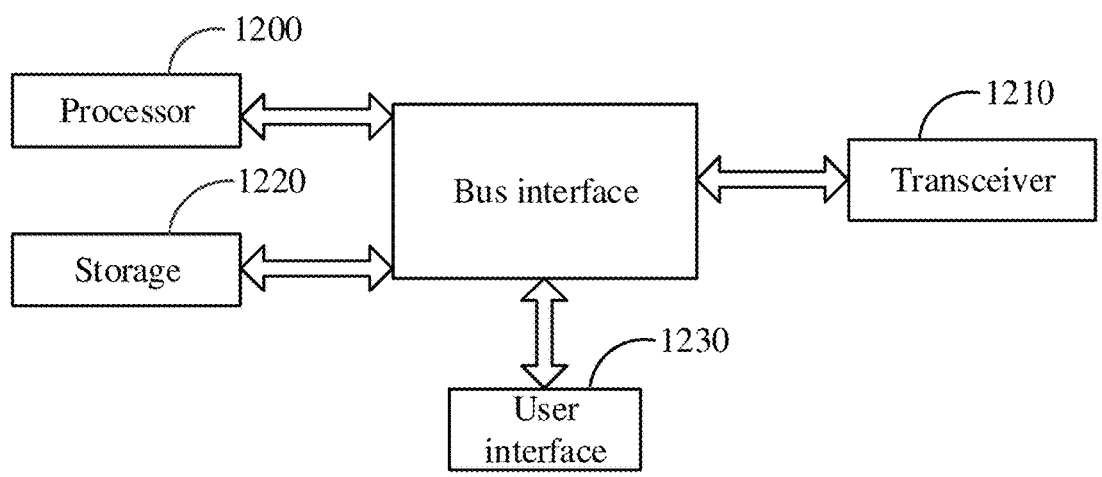
FIG. 12 is a schematic diagram of a structure of a UE in some embodiments of the present disclosure.

FIG. 12 is a schematic diagram of a structure of a UE. As shown in the figure, the user equipment includes a processor 1200 configured to read a program in a storage 1220 and implement the following processes:

receiving a target cell activation time instant T' notified by the source gateway, wherein the handover time instant T is the time instant at which the previous feeder link is disconnected and the establishment of a new feeder link is initiated, and the target cell activation time instant T' is T+ the time period (delta) required for the establishment of the feeder link;

synchronizing with the target cell at T';

a transceiver 1210, configured to receive and send data under the control of the processor 1200.

In some implementations, the target cell activation time instant T' is determined by the target gateway and included in the handover message and sent to all UEs currently served by the satellite.

In some implementations, the process further includes a following step:

the UE uses configuration in the handover message to perform RACH access and complete a handover process.

In some implementations, T and/or T' are GNSS time; and/or, T and/or T' are the SFN of the source gateway.

In FIG. 12, a bus architecture may include any number of interconnected buses and bridges. Specifically, various circuits such as one or more processors represented by the processor 1200 and a memory represented by the storage 1220 are linked together. The bus architecture can also link various other circuits such as peripherals, voltage regulators, power management circuits, etc., which are all known in the art, and therefore, will not be further described herein. A bus interface provides an interface. The transceiver 1210 may be a plurality of elements, including a transmitter and a receiver, and provide a unit for communicating with various other devices on the transmission medium. For different user equipment, a user interface 1230 may also be an interface capable of connecting externally and internally with a required device. The connected equipment includes, but is not limited to, a keypad, a display, a speaker, a microphone, a joystick, and the like.

The processor 1200 is responsible for managing the bus architecture and general processing, and the storage 1220 can store data used by the processor 1200 when performing operations.

Some embodiments of the present disclosure also provide a feeder-link handover device, which is located at a gateway, and includes:

an interaction module, configured to interact with a target gateway when the gateway is used as a source gateway, interact with a source gateway when the gateway is used as a target gateway, and determine the handover time instant T and/or the target cell activation time instant T', where the handover time instant T is the time instant when the previous feeder link is disconnected and establishment of the new feeder link is initiated, and the target cell activation time instant T' is T+ the time period (delta) required for the establishment of a feeder link;

a handover module, configured to initiate feeder-link handover at the handover time instant T' and instruct the UE to synchronize with the target cell at T'.

Some embodiments of the present disclosure also provide a device of handing over a UE belonging to a satellite. The device includes:

a reception module, configured to receive information of a target cell activation time instant T' notified by the source gateway, where the handover time instant T is the time instant when the previous feeder link is disconnected and the establishment of a new feeder link is initiated, and the target cell activation time T' is T+a time period (delta) required for the establishment of the feeder link;

a synchronization module, configured to synchronize with the target cell at T'.

For details of the modules, the implementation of the above-mentioned feeder-link handover method and the method of handing over a UE belonging to a satellite may be referred to.

Some embodiments of the present disclosure provide a readable storage medium, wherein the readable storage medium stores a program for implementing the above handover method.

Details of the above handover method, the implementation of the above-mentioned feeder-link handover method and the method for handing over the UE belonging to a satellite may be referred to.

For the convenience of description, each part of the above-mentioned device is divided into various modules or units according to functions and described separately. Of course, when implementing the present disclosure, the functions of each module or unit can be implemented in the same or multiple software or hardware.

In summary, some embodiments of the present disclosure provided a solution that the source gateway and the target gateway needs to negotiate to determine an accurate feeder-link handover time instant T, at which the source gateway disconnects the feeder links with the satellite, the target gateway initiates the establishment of a new feeder link.

It is further provided that the source gateway judges that a certain satellite will move out of the service range of the source gateway at time t1 (see the figure above) based on the ephemeris. The source gateway sends a feeder-link handover request message to the target gateway. The message contains the satellite identification, the longest possible service time (t1) of the current feeder link, and the latest possible time t3 for completing a handover preparation for all UEs, currently served by the satellite, to hand over to the target gateway.

After receiving the feeder-link handover request, the target gateway judges, according to the satellite identification indicated by the message and based on the ephemeris and other information, whether the satellite has entered the service range of the target gateway or when (t2) the target gateway can connect to the satellite so as to be served by the satellite. Combining t1 and t3 in the message, the target gateway can determine a suitable feeder-link handover time point T in the time interval (max(t2,t3)~t1). The target gateway returns a feeder-link handover response to the source gateway, and the response contains the satellite identification and the above-mentioned time point T.

The source gateway initiates the handover preparation process for each UE under the satellite, the target gateway determines the target cell activation time T'=T+delta, according to the T mentioned above and the time period (delta) required for the establishment of the feeder link, and informs the UE of the activation time in the handover message.

The UE synchronizes with the target cell at the time instant T', and then uses the configuration in the handover command to perform the RACH access to complete the handover process.

The technical solutions provided by the present disclosure are solutions for determining the accurate time point of the feeder-link handover between two gateways in a satellite internet system, and an activation solution for target cell configuration of conditional handover of the UE.

In a case that a satellite can only be connected to one gateway at the same time, the feeder-link handover of a satellite between the two gateways requires a precise a "relay" time point, otherwise the feeder-link handover may not be completed as soon as possible, causing significant service interruption to numerous connected UEs under coverage of the satellite. Some embodiments of the present disclosure provide a solution for obtaining an accurate feeder-link handover time instant through negotiation between two gateways, so that when the source gateway disconnects the feeder link, the target gateway can initiate an establishment process of a feeder link with the same satellite, thereby reducing service interruption caused by the handover of the feeder link to the minimum extent. In order to enable the UE to access the target cell in time, information of the activation time is also added in the handover command, which reduces the handover delay and better guarantees the service continuity of the UE before and after the handover.

Those skilled in the art should understand that the embodiments of the present disclosure can be provided as a method, a system, or a computer program product. Therefore, the present disclosure may adopt the form of a complete hardware embodiment, a complete software embodiment, or an embodiment combining software and hardware. Moreover, the present disclosure may take the form of a computer program product implemented on one or more computer-usable storage media (including, but being not limited to, a disk storage, an optical storage, etc.) containing computer-usable program codes.

The present disclosure is described with reference to flowcharts and/or block diagrams of methods, devices (systems), and computer program products according to some embodiments of the present disclosure. Each process and/or block in the flowcharts and/or block diagrams, and the combination of processes and/or blocks in the flowchart and/or block diagram can be realized by computer program instructions. These computer program instructions can be provided to a processor of a general-purpose computer, a special-purpose computer, an embedded processor, or other programmable data processing devices to generate a machine, so that the instructions executed by the processor of the computer or other programmable data processing devices are used to generate a device that realizes the functions specified in one or more processes in the flowcharts and/or one or more blocks in the block diagrams.

These computer program instructions can also be stored in a computer-readable memory that can direct a computer or other programmable data processing devices to work in a specific manner, so that the instructions stored in the computer-readable memory produce an article of manufacture including the instruction device. The instruction device implements the functions specified in one or more processes in the flowcharts and/or one or more blocks in the block diagram.

These computer program instructions can also be loaded on a computer or other programmable data processing devices, so that a series of operation steps are executed on the computer or other programmable devices to produce computer-implemented processing. Therefore, instructions executed on the computer or other programmable devices provide steps for implementing functions specified in one or more processes in the flowcharts and/or one or more blocks in the block diagrams.

Those of ordinary skill in the art can understand that all or part of the processes in the methods of the above-mentioned embodiments can be implemented by controlling relevant hardware through a computer program. The program can be stored in a computer readable storage medium. During execution, processes of the above-mentioned method embodiments may be executed. The storage medium may be a magnetic disk, an optical disc, a read-only memory (Read-Only Memory, ROM), or a random access memory (Random Access Memory, RAM), etc.

It can be understood that the embodiments described in the embodiments of the present disclosure may be implemented by hardware, software, firmware, middleware, microcode, or a combination thereof. For hardware implementation, modules, units, sub-modules, sub-units, etc. can be implemented in one or more application specific integrated circuits (ASIC), digital signal processors (Digital Signal Processing, DSP), digital signal processing device (DSP Device, DSPD), Programmable Logic Device (PLD), Field-Programmable Gate Array (Field-Programmable Gate Array, FPGA), general-purpose processors, controllers, microcontrollers, microprocessors, other electronic units or combinations thereof that perform the functions described in the present disclosure.

For software implementation, the technology described in the embodiments of the present disclosure can be implemented by modules (for example, procedures, functions, etc.) that perform the functions described in the embodiments of the present disclosure. Software codes can be stored in the memory and executed by the processor. The memory can be implemented in the processor or external to the processor.

Therefore, the purpose of the present disclosure can also be realized by running a program or a group of programs on any computing device. The computing device may be a well-known general-purpose device. Therefore, the purpose of the present disclosure can also be achieved only by providing a program product containing program codes for implementing the method or the device. That is, such a program product also constitutes the present disclosure, and a storage medium storing such a program product also constitutes the present disclosure. Obviously, the storage medium may be any well-known storage medium or any storage medium developed in the future. It should also be pointed out that in the device and the method of the present disclosure, obviously, each component or each step can be decomposed and/or recombined. This decomposition and/or recombination should be regarded as equivalent solutions of the present disclosure. In addition, the steps of performing the above-mentioned series of processing can naturally be performed in a chronological order or in an order of description, but do not necessarily need to be performed in the chronological order. Certain steps can be performed in parallel or independently of each other.

Obviously, those skilled in the art can make various changes and modifications to the present disclosure without departing from the spirit and the scope of the present disclosure. In this way, if these changes and modifications of the present disclosure fall within the scopes of the claims of the present disclosure and equivalent technologies, it is also intended that the present disclosure also includes these changes and modifications.

The invention claimed is:

1. 1. A feeder-link handover method performed by a source gateway, comprising:
   interacting with a target gateway and determining at least one of a handover time instant T or a target cell activation time instant T', wherein the handover time instant T is a time instant at which a previous feeder link is disconnected and establishment of a new feeder link is initiated, and the target cell activation time instant T' is T+a time period Δ (delta) required for the establishment of the new feeder link;
   initiating a feeder-link handover at the handover time instant T; and
   instructing a user equipment (UE) to synchronize with a target cell at the T,
   wherein the target cell activation time instant T' is determined by the target gateway and comprised in a handover message and sent to all UEs currently served by a satellite.

2. The method according to claim 1, wherein interacting with the target gateway and determining the handover time instant T comprises at least one of the following:
   sending handover reference time to the target gateway, and receiving the handover time instant T selected by the target gateway according to the handover reference time; or, determining the handover time instant T and notifying the target gateway of the handover time instant T; or, receiving the handover time instant T determined by the target gateway.

3. The method according to claim 2, wherein when sending the handover reference time to the target gateway, the handover reference time is: a latest time instant t1 at which the source gateway serves a feeder link, and a latest time instant t3 at which the source gateway completes handover preparation for all UEs, currently served by the satellite, to hand over to the target gateway.

4. A source gateway, comprising:
a processor, configured to read a program in a storage and implements steps of the feeder-link handover method according to claim 1; and
a transceiver, configured to receive and send data under a control of the processor.

5. The source gateway according to claim 4, wherein interacting with the target gateway and determining the handover time instant T comprises at least one of the following:
sending handover reference time to the target gateway, and receiving the handover time instant T selected by the target gateway according to the handover reference time; or,
determining the handover time instant T and notifying the target gateway of the handover time instant T; or,
receiving the handover time instant T determined by the target gateway.

6. The source gateway according to claim 5, wherein when sending the handover reference time to the target gateway, the handover reference time is: a latest time instant t1 at which the source gateway serves a feeder link, and a latest time instant t3 at which the source gateway completes handover preparation for all UEs, currently served by the satellite, to hand over to the target gateway.

7. A feeder-link handover method performed by a target gateway, comprising:
interacting with a source gateway and determining at least one of a handover time instant T or a target cell activation time instant T', wherein the handover time instant T is a time instant at which a previous feeder link is disconnected and establishment of a new feeder link is initiated, and the target cell activation time instant T' is T+a time period Δ (delta) required for the establishment of the new feeder link; and
initiating a feeder-link handover at the handover time instant T,
wherein the target cell activation time instant T' is determined by the target gateway and comprised in a handover message, and sent to all UEs currently served by a satellite.

8. The method according to claim 7, wherein interacting with the source gateway and determining the handover time instant T comprises at least one of the following:
receiving handover reference time sent by the source gateway, selecting the handover time instant T according to the handover reference time, and sending the selected handover time instant T to the source gateway; or,
receiving the handover time instant T determined by the source gateway; or,
determining the handover time instant T and notifying the handover time instant T to the source gateway.

9. The method according to claim 8, wherein when receiving the handover reference time sent by the source gateway, the handover time instant T selected by the target gateway according to the handover reference time is a time instant T selected between max (t2, t3) and t1, t2 is an earliest time instant at which the target gateway establishes a feeder link with a satellite.

10. A target gateway, comprising:
a processor configured to read a program in a storage and implement steps of a feeder-link handover method according to claim 7; and
a transceiver configured to receive and send data under a control of the processor.

11. The target gateway according to claim 10, wherein interacting with the source gateway and determining the handover time instant T comprises at least one of the following:
receiving handover reference time sent by the source gateway, selecting the handover time instant T according to the handover reference time, and sending the selected handover time instant T to the source gateway; or,
receiving the handover time instant T determined by the source gateway; or,
determining the handover time instant T and notifying the handover time instant T to the source gateway.

12. The target gateway according to claim 11, wherein when receiving the handover reference time sent by the source gateway, the handover time instant T selected by the target gateway according to the handover reference time is a time instant T selected between max (t2, t3) and t1, t2 is an earliest time instant at which the target gateway establishes a feeder link with a satellite.

13. A handover method for a user equipment (UE) belonging to a satellite, comprising:
receiving, by the UE, a target cell activation time instant T' notified by a source gateway, wherein the target cell activation time instant T' is T+a time period Δ (delta) required for establishment of a feeder link, and a handover time instant T is a time instant at which a previous feeder link is disconnected and establishment of a new feeder link is initiated; and
synchronizing with a target cell at T' by the UE,
wherein the target cell activation time instant T' is determined by a target gateway and is comprised in a handover message and sent to all UEs currently served by the satellite.

14. The method according to claim 13, further comprising:
performing random access channel RACH access through configuration in the handover message by the UE to complete a handover process.

15. A user equipment (UE), comprising:
a processor configured to read a program in a storage and implement the steps of the handover method according to claim 13;
a transceiver configured to receive and send data under a control of the processor.

* * * * *